United States Patent
Li et al.

(10) Patent No.: US 7,650,333 B2
(45) Date of Patent: Jan. 19, 2010

(54) SMARTFILTER IN MESSAGING

(75) Inventors: John L. Li, Kirkland, WA (US); Paul K. Kromann, Redmond, WA (US); Hui Chen, Sammamish, WA (US); Colen M. Garoutte-Carson, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 478 days.

(21) Appl. No.: 11/358,637

(22) Filed: Feb. 21, 2006

(65) Prior Publication Data

US 2007/0198483 A1 Aug. 23, 2007

(51) Int. Cl.
G06F 17/30 (2006.01)

(52) U.S. Cl. ............................. 707/3; 707/6
(58) Field of Classification Search ............... None
See application file for complete search history.

(56) References Cited

U.S. PATENT DOCUMENTS

| | | | |
|---|---|---|---|
| 2002/0052196 A1* | 5/2002 | Padawer et al. ............. 455/414 |
| 2002/0091690 A1* | 7/2002 | Bailey et al. ................... 707/6 |
| 2004/0203654 A1* | 10/2004 | Bass et al. ................ 455/414.1 |
| 2004/0203954 A1* | 10/2004 | Mikan et al. ................. 455/466 |
| 2005/0198353 A1* | 9/2005 | Zmrzli ........................ 709/232 |
| 2005/1023488 * | 10/2005 | Bailey et al. ................... 707/3 |

* cited by examiner

Primary Examiner—Pierre M Vital
Assistant Examiner—Loan T Nguyen
(74) Attorney, Agent, or Firm—Woodcock Washburn LLP

(57) ABSTRACT

The subject application relates to a system(s) and/or methodology that facilitate filtering any set of items in a quick and efficient manner including messages and optionally calendar, notes, and task items. More specifically, as a filter string (input) is entered, it can be immediately compared to properties associated with a selected set of items to filter. As a result, the set of items can be dynamically filtered based on the input entered according to a one-to-one match of the filter string with any selected item or message property. Message properties can include sender, subject, and body of a message. Any items that match the input can be presented to the user in the form of a list. As additional input is entered, the list may dynamically change as more input or less input is received. Thus, any items that match the input appear on the list.

20 Claims, 10 Drawing Sheets

SMARTFILTER IN MESSAGING

BACKGROUND

Many portable computing devices have some storage capabilities for some or all of the following: messages, contacts, notes, photos, calendar items, etc. Methods for data retrieval may vary slightly between devices but for the most part, users are required to perform tedious search or find operations in order to access a particular item. These may entail having to remember the item name or at the very least, the item's location, through which the user can scroll to locate the desired item(s). For a small number of items, this task may be manageable. However, when there are hundreds or even dozens of items, this task becomes rather cumbersome and impracticable to perform in an efficient manner. In addition, the desired item can be easily missed or overlooked due to the smaller display space typically provided on such portable computing devices. Hence, finding a specific item can be both time-consuming and prone to error.

SUMMARY

The following presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

The subject application relates to a system(s) and/or methodology that facilitate filtering any set of items in a quick and efficient manner. More specifically, as input is entered, it can be immediately compared to properties associated with a set of items. As a result, the set of items can be dynamically filtered based on the input entered. Any items that match the input can be presented to the user in the form of a list. As additional input is entered, the list may dynamically change as more input or less input (e.g., deleted input) is received. Thus, any stored items that match the input appear on the list.

Matches can be determined according to exact, whole word, out-of-order, or sub-string matches with the input. When using a 12-key numpad such as on a phone or phone based device (e.g., PDA or smartphone), all possible alphanumeric permutations of the entered string can be used to filter the given set of items without commitment by the user. In particular, most if not all keys on the 12-key numpad can correspond to characters, letters, and/or a number. Take, for instance, the number 2 key which when pressed can indicate the number 2 or A or B or C. The user can press this key to initiate a filter operation without committing to whether he wants to filter on the 2, the A, the B or the C. Rather, the system filters through the set of items using all or substantially all possible permutations.

The set of items can include any type of message, calendar items, task items, notes, documents, photos, and the like. More than one set of items can be filtered at a time. That is, one set of items can be selected for filtering. Alternatively, multiple sets of items can be selected for filtering at the same time. As a result, any items that match the input can be presented according to type. That is, if a filter string matches email messages, SMS messages, an instant message and a few notes, then these items can be grouped according to type for easier viewing. The filter string can be compared to the items' properties and/or associated metadata. For example, messages can be filtered according to date, sender, cc: line recipient(s), subject, body, and/or headers or footers. Filter settings can be determined by system default or by the user. Thus, one user may wish to filter messages only by sender, subject, and body; whereas another user may wish to filter on all available message properties.

Entering or depressing a first character, letter, or number key can automatically begin the filter operation regardless of the current on-screen view. The match list can immediately notify the user if a wrong character, letter, or number has been entered by virtue of the items presented in the list or lack thereof. Likewise, the current filter string can be visually enhanced as it appears in the matched item to alert the user of the current filter string. For example, if the filter string is soccer, then soccer can appear in a different font or color or can be highlighted in the matched item to make the filter string readily apparent to the user.

Due to smaller screen sizes on most portable devices, the filter string in the matched item may be off the screen and thus, not visible to the user. To mitigate this occurrence, the system can automatically truncate the item contents so that the filter string in the matched item appears on-screen. Hence if soccer appears at the end of a long subject line such as when is the last practice session for soccer, the system can truncate the subject line content to . . . session for soccer so that the user can readily see the filter string in the matched item. By doing so, the user can maintain an awareness of the filter string. Otherwise, the item would appear as when is the practice . . . which does not indicate how or why this item matches the filter string.

Though filtering in this manner is relatively fast and efficient, some users may desire to save their filtered views of items (e.g., lists of matched items). The system and method can provide this convenience by allowing each list of matched items to be stored and later recalled as desired. Furthermore, keys on a 12-key numpad, for instance, can be customized to map to other words, characters, or terms in addition to their pre-defined character, letter, or number. This can further improve the user's efficiency when looking for desired items.

To the accomplishment of the foregoing and related ends, certain illustrative aspects of the invention are described herein in connection with the following description and the annexed drawings. These aspects are indicative, however, of but a few of the various ways in which the principles of the invention may be employed and the subject invention is intended to include all such aspects and their equivalents. Other advantages and novel features of the invention may become apparent from the following detailed description of the invention when considered in conjunction with the drawings.

DETAILED DESCRIPTION

Figure 1:
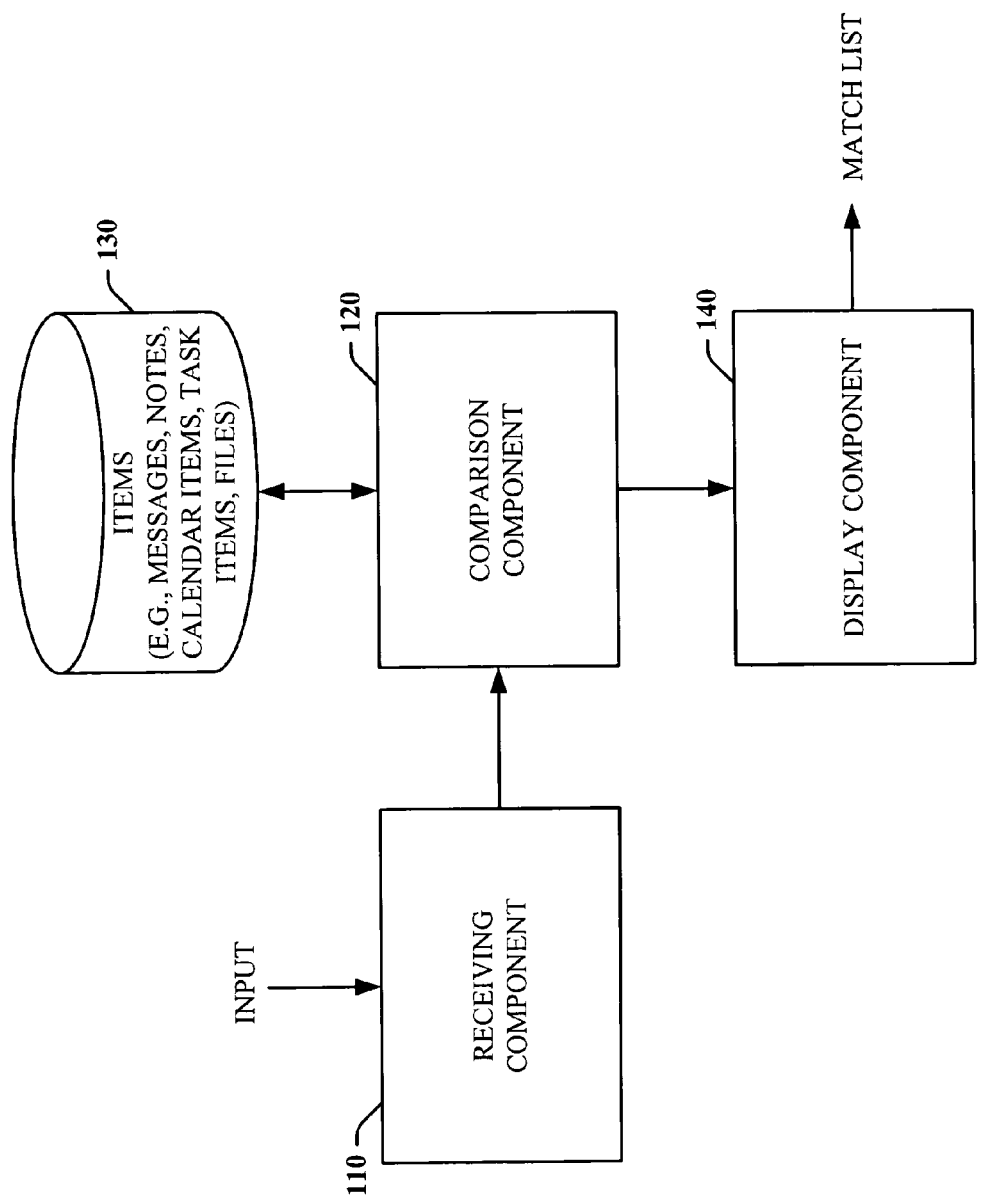
FIG. 1 is a block diagram of a system that facilitates dynamic filtering of a set of items as input is entered.

The subject systems and/or methods are now described with reference to the drawings, wherein like reference numerals are used to refer to like elements throughout. In the following description, for purposes of explanation, numerous specific details are set forth in order to provide a thorough understanding of the systems and/or methods. It may be evident, however, that the subject systems and/or methods may be practiced without these specific details. In other instances, well-known structures and devices are shown in block diagram form in order to facilitate describing them.

As used herein, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

The subject systems and/or methods can incorporate various inference schemes and/or techniques in connection with recognizing a previously entered filter string and automatically suggesting the filter string when at least a subset of the search string is entered. For example, suppose that a user has previously entered a filter string for spammer at least once before to view email and SMS messages concerning a particular virus threat. The system can remember this filter string for a limited or unlimited amount of time. Subsequently, when the user begins to enter the first few letters of spammer (e.g., at least "sp"), the system can automatically complete the filter string with a guess as to what the remaining letters may be. The user can accept the suggestion or continue entering characters or numbers to override or ignore the suggestion. By automatically providing suggestions to complete the filter string, time can be saved by not requiring the user to enter the full filter string or even most of it. Rather, the system can recall previous filter strings and estimate the most relevant filter string based on the input.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In general, mobile device users often have many messages including email, SMS, and instant messages, in addition to notes, calendar items, tasks, documents, and photos stored on their devices. One very common user task is to look for a specific message, note, calendar entry, task, document, or photo. Conventional techniques require the user to scroll through a long list of messages, for instance, until the specific one is displayed on-screen. Furthermore, screen real estate is severely limited on some mobile devices such as cell phones and smartphones which often means that as few as only 5 messages can be viewed at one time, which makes it easy to miss the message for which the user is searching. The application as described with respect to the figures below provides systems and methods that involve filtering a set of items (e.g., messages) according to input that is entered—as it is being entered.

Referring now to FIG. 1, there is a general block diagram of a system 100 that facilitates dynamic filtering of a set of items based on the input that is entered. The system 100 includes a receiving component 110 that can receive input such as alphanumeric input that has been entered using any one of a keyboard, keypad, stylus, mouse, ink stylus, voice, or any other pointing device. The alphanumeric input can include characters, such as letters or punctuation, and numbers. When input is received, a comparison component 120 can compare it to one or more items 130 stored locally on the computing device (or remotely therefrom). In particular, beginning with the first character or number entered, a first character or number of any item property can be compared thereto. Hence, there is a one-to-one mapping between input received and content of the items 130. When at least one match is found, it can be presented on-screen to the user by a display component 140. As input continues to be entered, the list of matches presented on-screen may change accordingly. The items which can be filtered in this manner can include messages as well as notes, calendar events, tasks, and other types of documents or files. The types of messages may be email, SMS, and instant messages.

In practice, for example, imagine the user wants to filter his messages to quickly find those concerning an upcoming tournament and he has preset his device to filter on the message sender and subject properties only. The user enters T and nearly immediately, a list of matches appears on the display. The list includes messages from 'Tom', 'Thomas Jones', 'Tammy White', 'tank21@hm.com', and 'theman@hm.com' (not necessarily in this order) and messages with the subject 'tourney', 'tournament', 'softball tournament', 'Tuesday meeting', 'lunch today' and 'what are u doing tomorrow'. He adds a T and the list disappears and is replaced with No matches found. He realizes that he must have mistyped and begins again by entering T again and then followed by O. The list of messages nearly immediately changes from messages with the matched terms beginning with T:

'Tom'
'Thomas Jones'
'Tammy White'
'tank21@hm.com'
'theman@hm.com'

'tourney'
'tournament'
'Tuesday meeting'
'softball tournament'
'lunch today'
'what are u doing tomorrow' to the following messages upon entering O:
'Tom'
'tourney'
'tournament'
'softball tournament'
'lunch today'
'what are u doing tomorrow'.

By entering the O, the filter string and essentially the filter changed to now filter on TO rather than just on T. After the user has entered TOU, the list rapidly changes again to display messages with the following partially marked match terms:
'tourney'
'tournament'
'softball tournament'.

The filter string as it appears in any matched items can be underlined, bolded, italicized, highlighted, or otherwise modified to notify the user of the current filter string being run against the messages. Thus, in the time that it takes to enter the letters TOU, the user can quickly view a list of the relevant messages without having to manually scroll through the hundreds of messages he has stored on his device.

Figure 2:
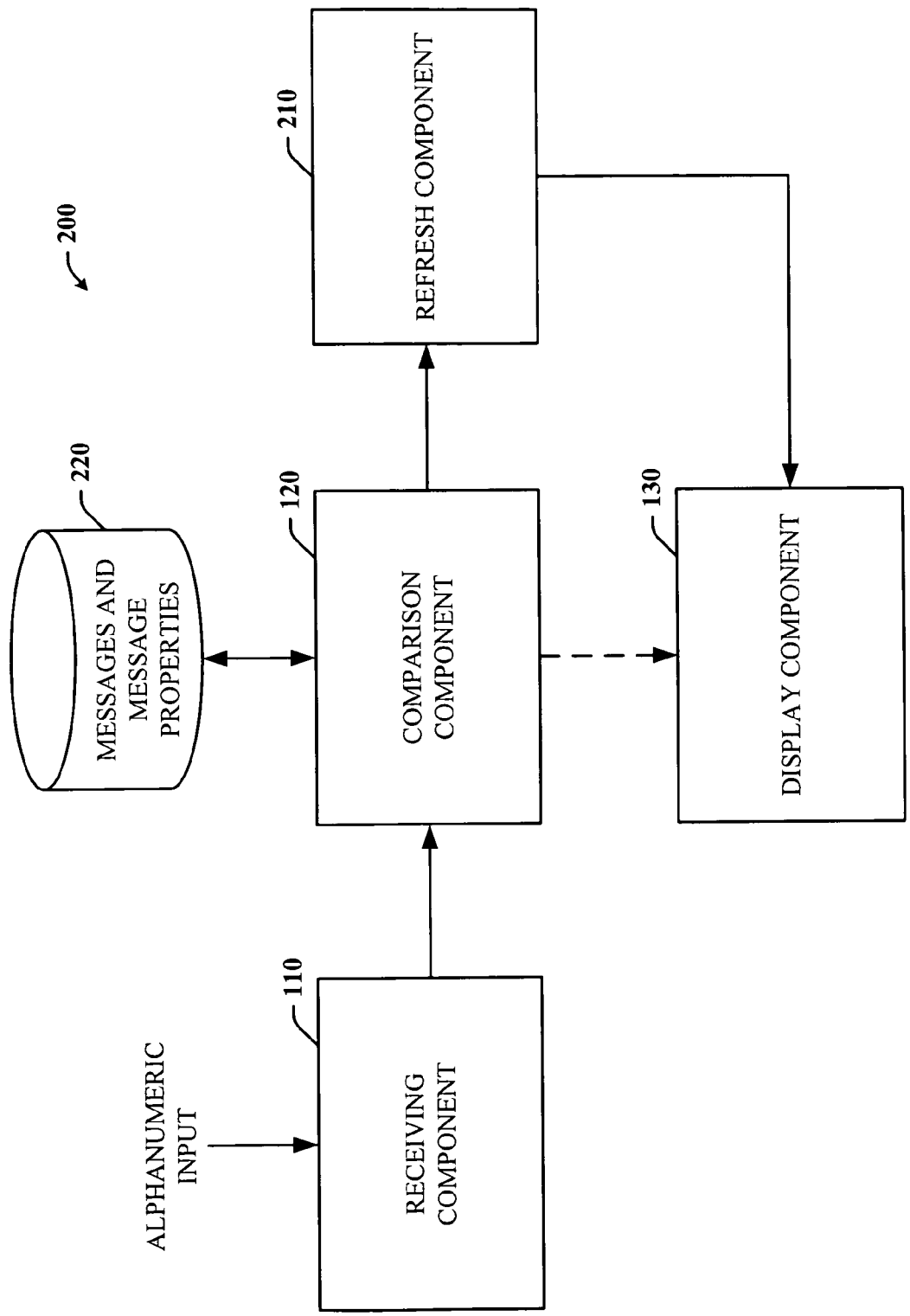
FIG. 2 is a block diagram of a system that facilitates dynamic filtering of a set of message items as alphanumeric input is entered and dynamically displaying any matches to the input.

This automatic refresh action of the displayed items can be performed by a refresh component 210 as depicted in the diagram in FIG. 2. The refresh component 210 facilitates the dynamic display of match results. Thus, with each new piece of input, the system re-filters the set of messages (220) and updates the results displayed as necessary. If the additional input does not change the results in the list, then the contents of the list do not change.

Figure 3:
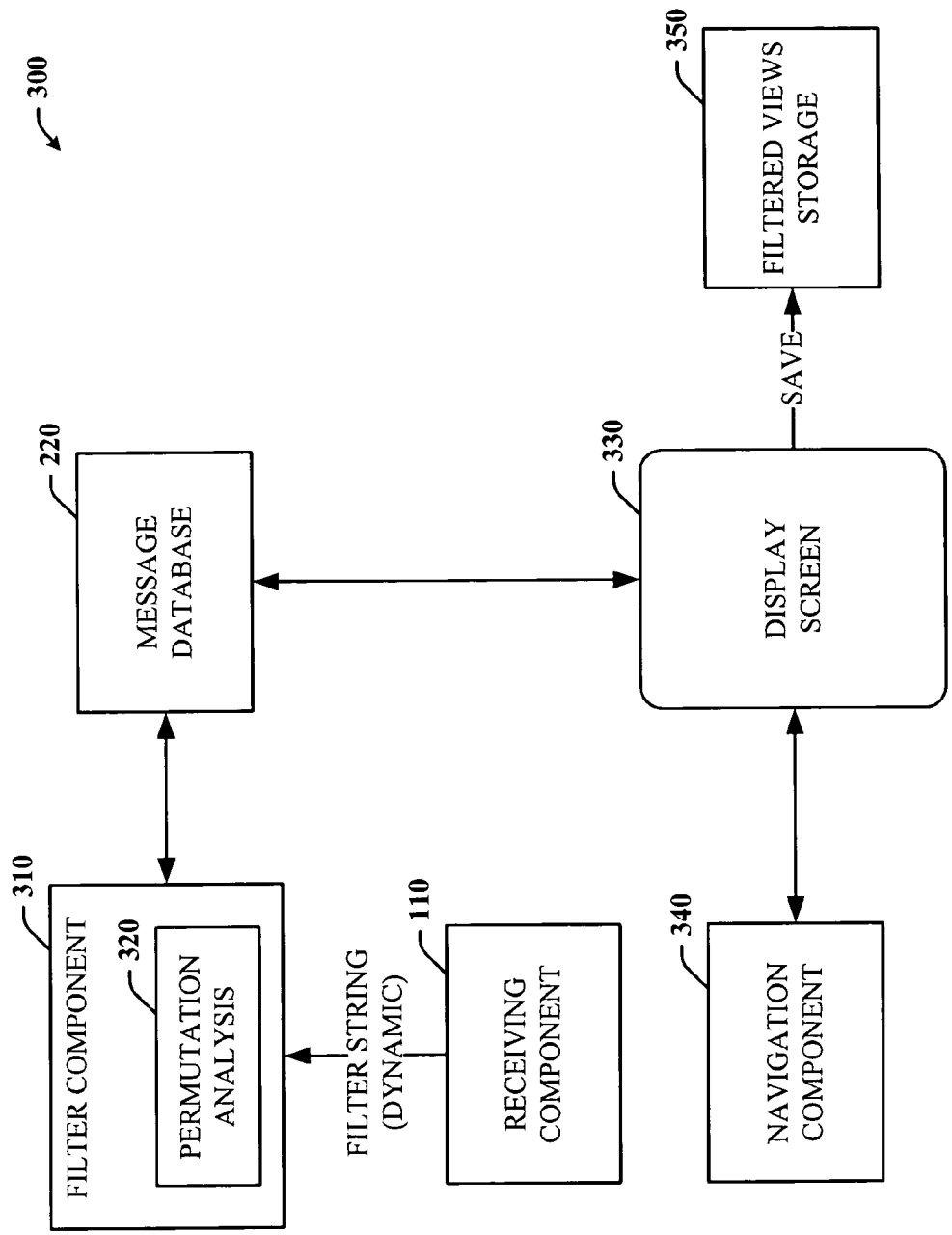
FIG. 3 is a block diagram of a system that facilitates dynamic filtering of a set of messages according to all permutations of any input entered as it is being entered and navigating about the display screen.

Turning to FIG. 3, there is a block diagram of a system 300 that facilitates dynamic filtering of a set of messages according to all permutations of a filter string and navigating about the display screen to view and/or select any matches. In addition to the functionalities discussed in FIGS. 1 and 2, above, the system 300 includes a filter component 310 that can filter a set of messages (220) according to a plurality of permutations (320) of the filter string. It should be appreciated that the filter string may be dynamic—constantly changing with the addition or deletion of one or more characters, letters, or numbers. As each permutation is considered, the corresponding matches, if any, can be presented on the display screen 330. If the user does not see the desired set of matches due to a mistake in the filter string or a change in filtering approach, one or more navigation components 340 can be employed to reset the filter component 310 or to modify the current filter string. In some cases, the user may want to store the current filtered view (or list of matches) for later retrieval or to transfer the list to another device or user. These can be maintained in a filtered-view storage 350 according to the corresponding filter string. The filter component 310 can be applied to this set of items as well.

Figure 4:
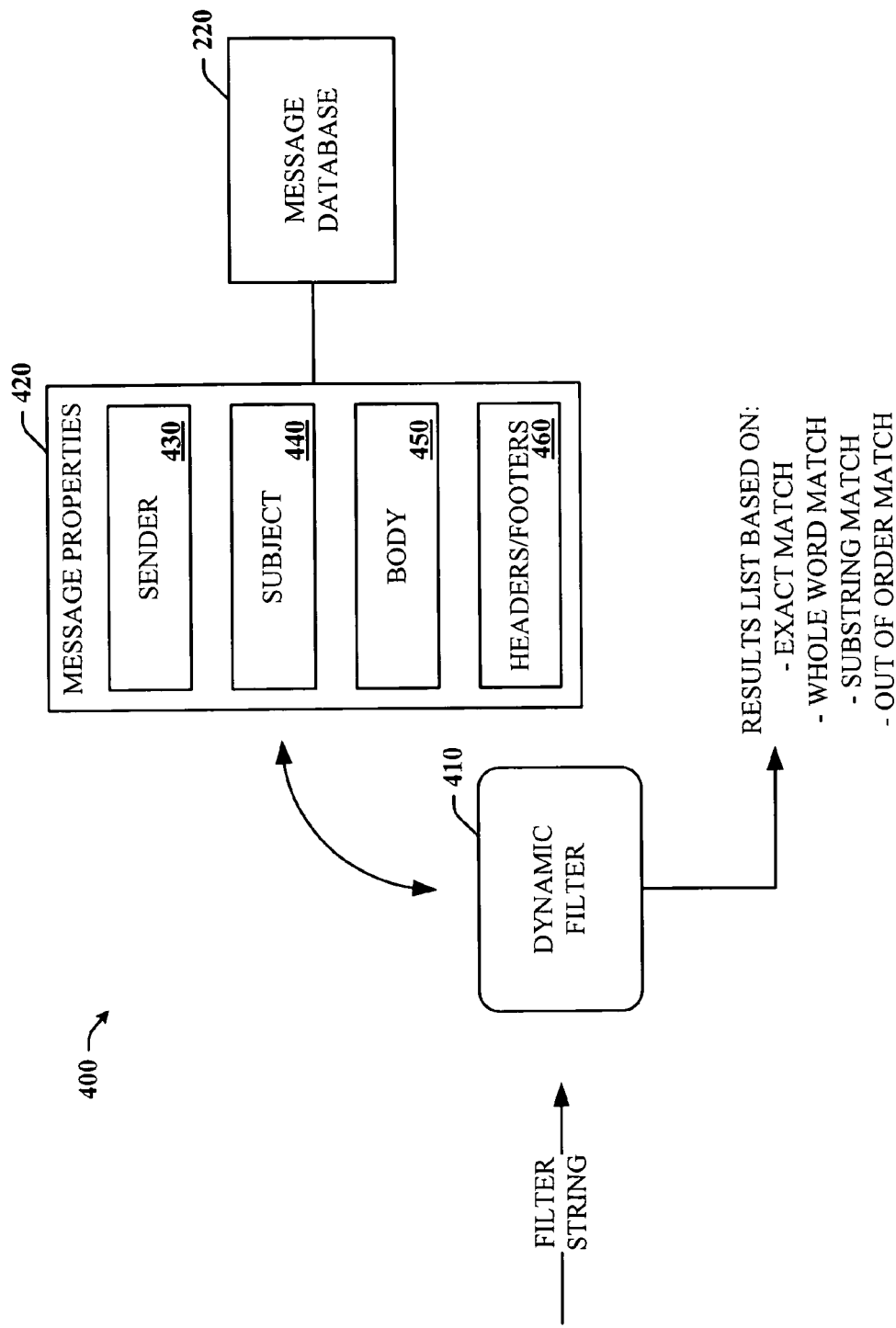
FIG. 4 is a block diagram of a filtering system that facilitates dynamic filtering of a set of message items according to one or more message properties.

In FIG. 4, there is a block diagram of a filtering system 400 that facilitates dynamic filtering of a set of message items according to one or more message properties. In particular, a dynamic filter 410 receives a filter string of at least one character or number. The filter string essentially determines how the relevant set of messages will be filtered and which messages should be displayed to the user. With respect to messages including email, SMS, and instant messages, a user can select which properties 420 to filter. That is, the filter can compare the filter string to specific features of a message such as the sender 430, subject line 440, body 450 of the message, and/or headers/footers 460 which may or may not be visible to the user. Other message properties can also be used by the filter such as cc line content, date or time sent or received, priority, or any other field or property associated with the message that may be visible or invisible to the user. Some services can automatically label messages as junk or spam or with some other title. Messages can be filtered on this feature as well. The filter 410 can return exact matches, whole word matches, sub-string matches, or out-of-order matches (e.g., filter string=discount on computer can match "computer discount"). Again, the user can indicate the match preference.

Figure 5:
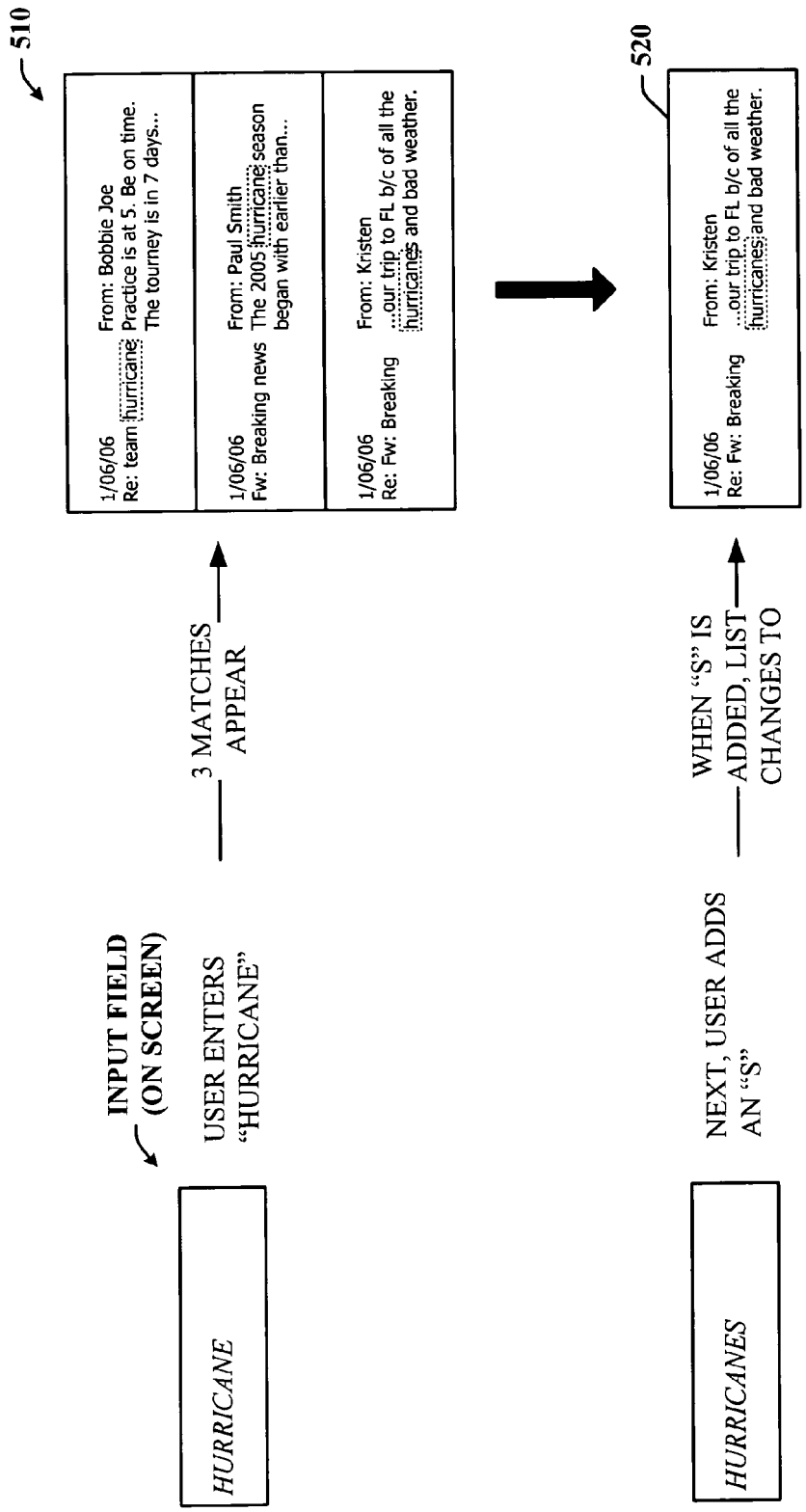
FIG. 5 is a diagram of an exemplary message filtering operation as performed on a computing device via the system of FIG. 1, for example.

Turning now to FIG. 5, there is a diagram of an exemplary message filtering operation as performed on a computing device via the system of FIG. 1, for example. The diagram demonstrates an input field that may or may not appear on the device screen. When present, the user can visualize his/her input in the input field. Here in FIG. 5, the user would like to filter his/her messages on the string HURRICANES. When HURRICANE is entered, 3 matches 510 appear as shown. The filter string can be visually enhanced as it appears in the matched item. For instance, HURRICANE can be boxed as shown, highlighted, or encircled. When the user adds an S to HURRICANE, the contents of the match list changes (520). Due to the limited screen size of some portable devices, only a small portion of each matched item may appear on-screen. To maintain the visibility of the filter string as it appears in the matched item, the contents before as well as after can be truncated. This is illustrated in the message 520. The beginning of the message is truncated, which is indicated by the ellipsis, so that the filter string can remain visible and the user's awareness of such is intact.

Figure 6:
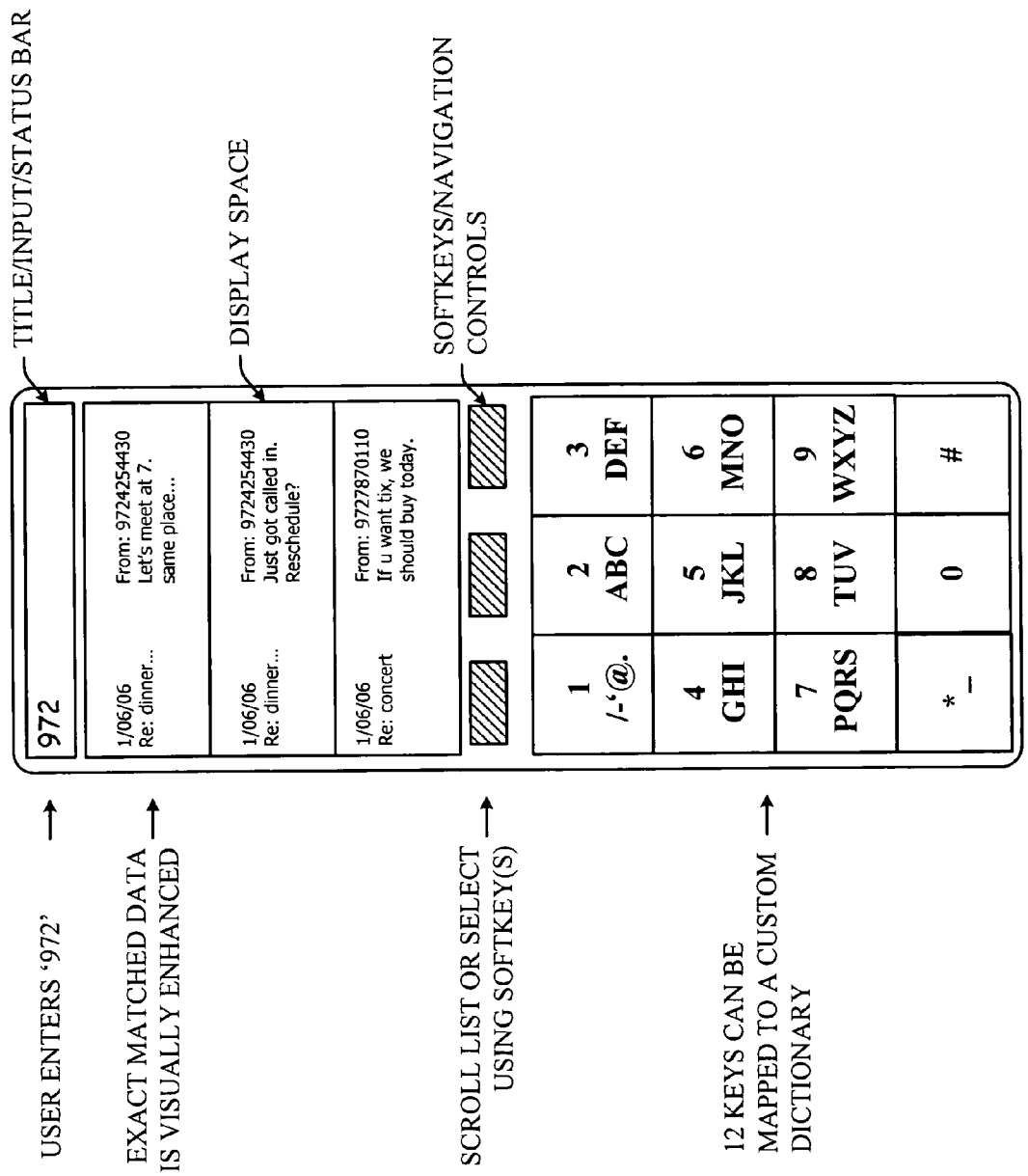
FIG. 6 is a diagram of an exemplary user interface on a portable device whereupon a filtering operation is performed to filter a set of messages.

Turning now to FIG. 6, there is a diagram of an exemplary user interface on a portable device whereupon a filtering operation is performed on a set of messages. On this device screen, a title/input/status bar is provided to allow the user to view any input or the current state of the device or the current filter. One or more soft keys can be employed as navigational controls to navigate through the display space and the title/input/status bar. For example, if a wrong key is pressed, the user can use a backspace, delete, clear or undo soft key to correct the mistake.

Alternatively or in addition, at least a subset of the content (in a match result) that matches the filter string can be displayed. For example, if the user types "227", then the filter may find the following match results: "car", "bar", and "basic". The status string can display "car, bar, bas" to emphasize what the current input is matching. This can be particularly helpful since the screens on some mobile devices are relatively small and thus, may or may not include the status bar.

Any of the 12 alphanumeric keys on the keypad can be used to enter any input for filtering. In addition to the characters or letters that are mapped to each number key, the user can build a custom dictionary by assigning one or more words, terms, abbreviations, or other character string to any of the 12 keys. For example, if the user frequently filters on the string MARITIME, he/she can program the 3 key to map to this string. Thus, when the 3 key is pressed, the filter can process all permutations of the key: the number 3, the D, the E, the F, and MARITIME to locate any matches. In addition a sequence of keys can be mapped to a particular term, word or phrase as well. For instance, MARITIME can be mapped to 7-8-9. Therefore, when 7-8-9 is entered, the filter can process all permutations of 7-8-9 as well as MARITIME.

Various methodologies will now be described via a series of acts. It is to be understood and appreciated that the subject system and/or methodology is not limited by the order of acts, as some acts may, in accordance with the subject application, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject application.

Figure 7:
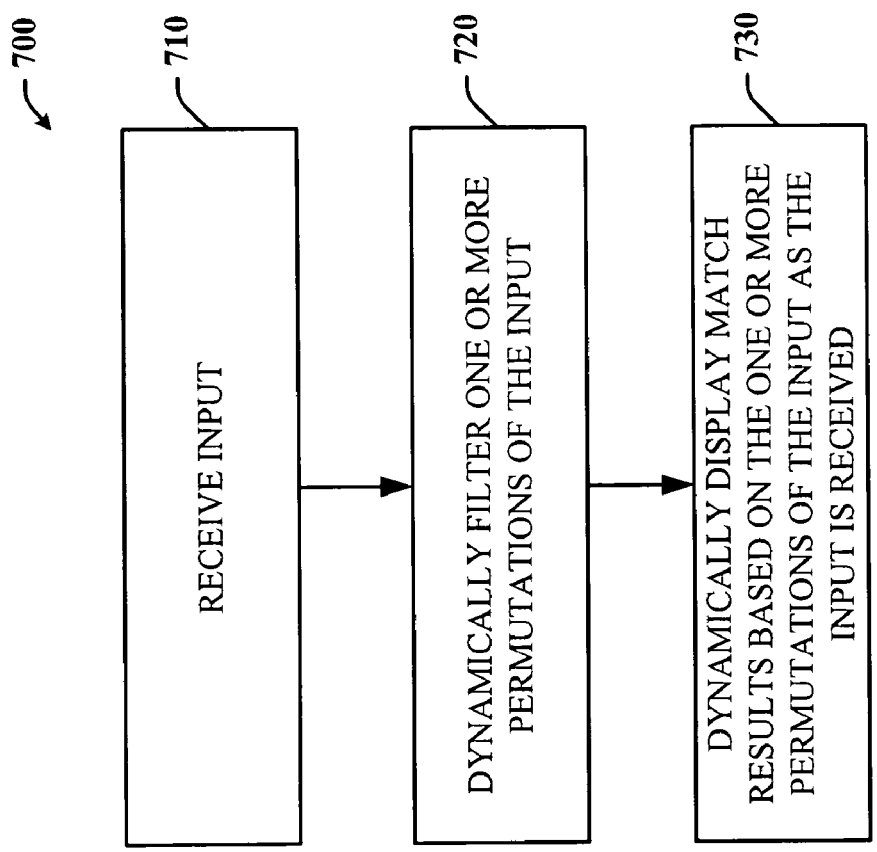
FIG. 7 is a flow diagram illustrating an exemplary methodology that facilitates dynamic filtering of a set of items based on input that is entered.

Referring now to FIG. 7, there is a flow diagram illustrating an exemplary methodology 700 that facilitates dynamic filtering of a set of items as input is entered. The methodology 700 involves receiving input or a filter string at 710 and dynamically filtering one or more permutations of the input at 720. At 730, the match results can be dynamically displayed based on the one or more permutations of the filter string. In particular, there is a one-to-one mapping between the filter string and the displayed results, thus any change to the filter string may result in a change in the results displayed. The set of items comprise messages and optionally calendar items, tasks, notes, documents, and photos. By performing the method 700, the user can quickly obtain a list of items that have been distinguished from a larger set of such items by simply pressing a few keys on a keypad or typing or speaking a desired filter string.

Figure 8:
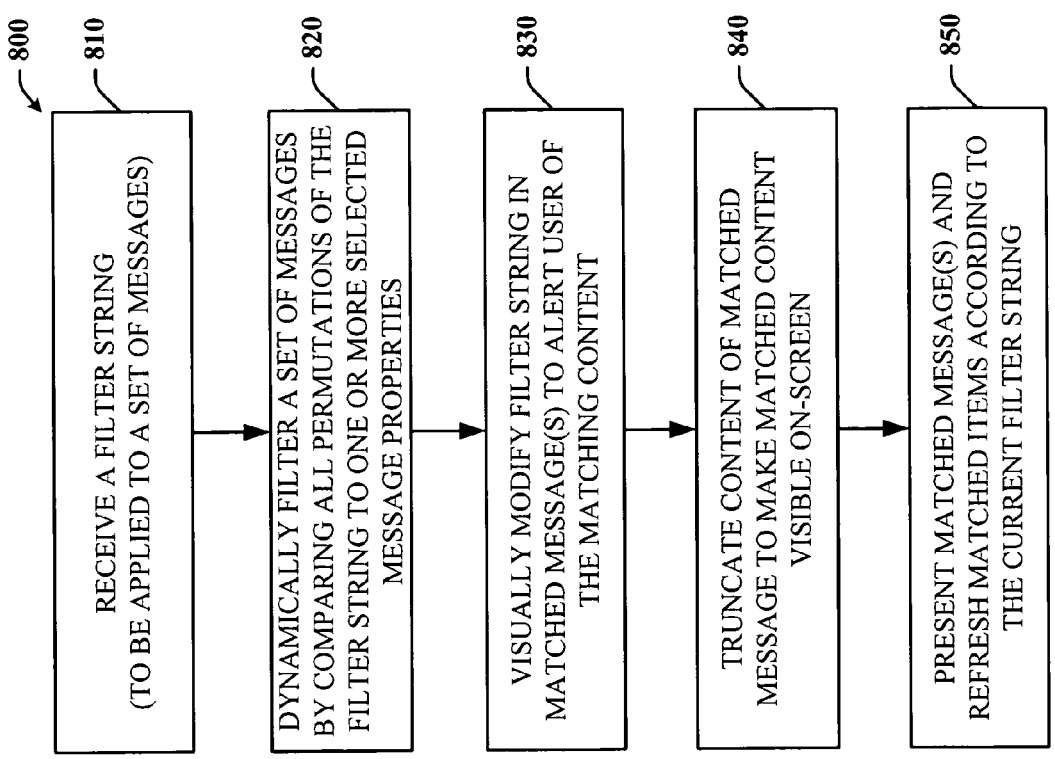
FIG. 8 is a flow diagram illustrating an exemplary methodology that facilitates dynamic filtering of a set of message items according to a plurality of permutations of the input entered.

FIG. 8 is a flow diagram illustrating an exemplary methodology 800 that facilitates dynamic filtering of a set of message items according to a plurality of permutations of the filter string entered. More specifically, the methodology 800 involves receiving a filter string at 810 comprising alphanumeric input. The alphanumeric input can include letters, numbers, spaces, and punctuation. At 820, a set of messages can be filtered in a dynamic manner according to all permutations of the filter string. The filtering can be performed by comparing each character, letter, or number of the filter string in its given sequence by the content of one or more selected message properties. At 830, the filter string can be visually modified as it appears in the matched item(s) to alert the user of the matching content. For example, the filter string can appear as boxed, circled, highlighted and/or can appear in a different color, font, or font size. To accommodate for smaller device screens and display spaces, content of the matched item can be truncated at 840 to make the filter string as it appears in the matched item visible to the user. Otherwise, the user may forget the current filter string or may not realize that the current filter string includes one or more mistyped letters or numbers. Finally, at 850, any messages found to match the current filter string can be presented on the device screen.

Figure 9:
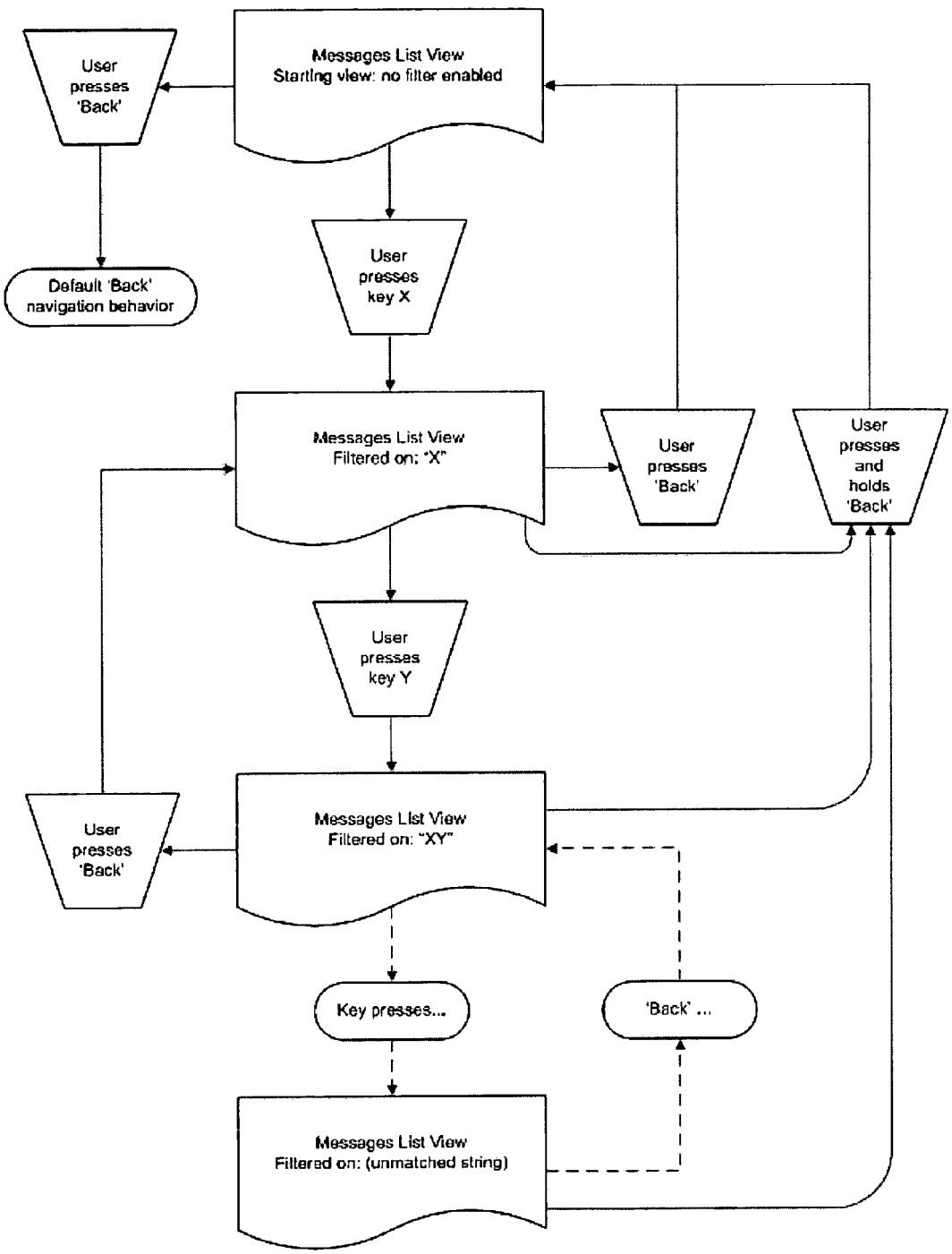
FIG. 9 illustrates a behavioral flow of the systems and methods in one or more of the above figures.

Moving on to FIG. 9, there is an exemplary behavioral flow of the systems and methods as described in one or more of the above figures. In particular, the behavioral flow demonstrates a series of inputs (key presses) and the resulting outputs.

Figure 10:
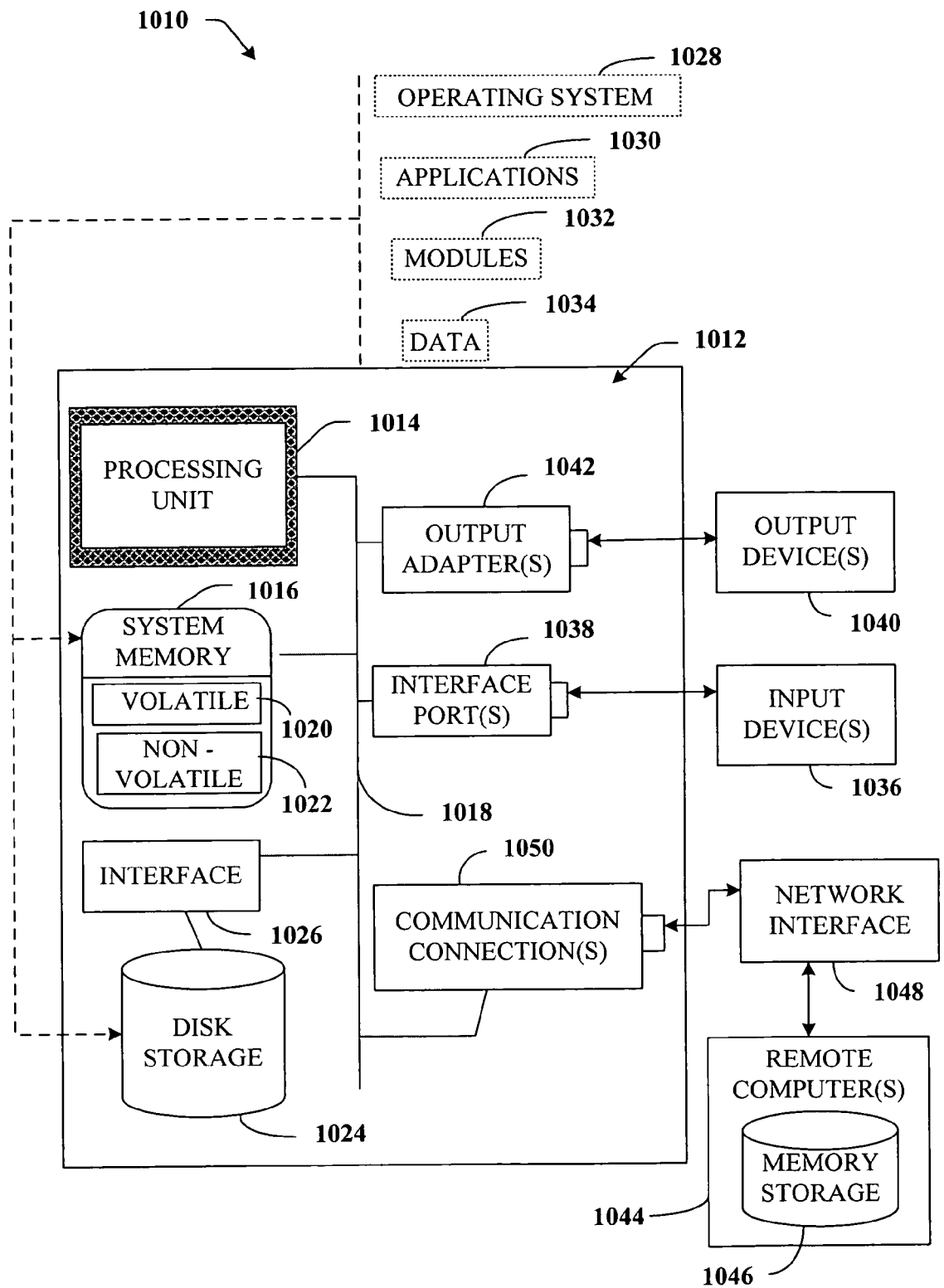
FIG. 10 illustrates an exemplary environment for implementing various aspects of the invention.

In order to provide additional context for various aspects of the subject invention, FIG. 10 and the following discussion are intended to provide a brief, general description of a suitable operating environment 1010 in which various aspects of the subject invention may be implemented. While the invention is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 1010 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 10, an exemplary environment 1010 for implementing various aspects of the invention includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MCA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSD).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable ROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/nonremovable, volatile/nonvolatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in suitable operating environment 1010.

Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the subject invention can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012 and to output information from computer 1012 to an output device 1040. Output adapter 1042 is provided to illustrate that there are some output devices 1040 like monitors, speakers, and printers among other output devices 1040 that require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

What has been described above includes examples of the subject system and/or method. It is, of course, not possible to describe every conceivable combination of components or methodologies for purposes of describing the subject system and/or method, but one of ordinary skill in the art may recognize that many further combinations and permutations of the subject system and/or method are possible. Accordingly, the subject system and/or method are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates dynamic filtering of a set of items and providing filtered views of desired items comprising:
   a memory having stored therein computer-executable instructions;
   a computer processor that executes computer executable-instructions;
   a receiving component that receives a first alphanumeric input;
   a filter component that determines whether to use an alternative alphanumeric input for matching based on a comparison of the alternative alphanumeric input with the first alphanumeric input;
   a comparison component that dynamically performs a one-to-one matching between the alternative alphanumeric input and one or more item properties to determine whether at least a subset of the items include content that matches the alternative alphanumeric input if it is determined to use the alternative alphanumeric input, the items comprise messages;
   a display component that dynamically presents any items that match the alternative alphanumeric input on a device screen; and
   a refresh component that facilitates updating items presented on the device screen as input is received and automatically filtered against the set of items.

2. The system of claim 1, the comparison component dynamically performs the one-to-one matching for a plurality of permutations of the alternative alphanumeric input.

3. The system of claim 1, the items comprise at least one of calendar items, notes, tasks, documents, and photos.

4. The system of claim 1, the comparison component dynamically performs at least one of: exact matching, out-of-order matching, or sub-string matching between the alternative alphanumeric input and one or more item properties.

5. The system of claim 1, the item properties for message items comprise at least one of: sender, subject, body, priority, or headers/footers.

6. The system of claim 1, the messages comprise email, SMS, or instant messages.

7. The system of claim 1 further comprises an input component that provides the first alphanumeric input, wherein the input component comprises a keyboard, a keypad, a mouse, a stylus, an ink stylus, or a voice recognition component.

8. The system of claim 1 further comprises a filtered view storage that maintains one or more lists of matched items.

9. The system of claim 1, each matched item comprises a visually enhanced view of the current filter string as found in the matched item.

10. A method that facilitates dynamically providing a filtered view of a set of items based on input that is entered comprising:

receiving a first filter string comprising alphanumeric content as input on a computing device;

determining whether to use an alternative filter string for filtering based on a comparison of the alternative filter string with the first filter string;

dynamically filtering one or more permutations of the alternative filter string on a set of items to determine whether the alternative filter string matches one or more item properties if it is determined to use the alternative filter string, whereby the items comprise messages; and dynamically displaying available match results based on the one or more permutations of the alternative filter string on a screen of the computing device, dynamically displaying the match results comprises continuously refreshing the match results on the device screen as the first filter string changes and is re-filtered against the item properties.

11. The method of claim 10, the dynamic filtering is performed by a one-to-one matching between the alternative filter string and one or more item properties to determine whether at least a subset of the items include content that matches the first filter string.

12. The method of claim 10, the items further comprise at least one of: calendar items, notes, tasks, documents, or images.

13. The method of claim 10, dynamically filtering the set of items further comprises determining at least one of the following between one or more permutations of the alternative filter string and the set of items: an exact match, an out-of-order match, a whole word match, or a sub-string match.

14. The method of claim 10 further comprises visually enhancing the alternative filter string as it appears in the match result to indicate a current filter string.

15. The method of claim 14, visually enhancing the alternative filter string comprises at least one of the following: forming a box around the filter string, circling, highlighting, and changing a color, font, or font size of the filter string.

16. The method of claim 10 further comprises at least one of the following: dynamically displaying at least a subset of content of a match result that matches the alternative filter string on the device screen; and truncating at least a portion of content in the match result to make the alternative filter string visible in the match result on the device screen.

17. The method of claim 10 further comprises storing one or more lists of match results for later retrieval or use.

18. A computing-based system employing a processing unit operatively coupled to memory that facilitates dynamic filtering of a set of items and providing filtered views of desired items in a portable computing device, the system comprising:

means for receiving alphanumeric input;

means for determining whether to use an alternative alphanumeric input for matching based on a comparison of the alternative alphanumeric input with the first alphanumeric input;

means for dynamically performing a one-to-one matching between current alphanumeric input and one or more item properties to determine whether at least a subset of the items include content that matches the alternative alphanumeric input if it is determined to use the alternative alphanumeric input, the items comprise messages, the one-to-one matching includes mapping the current alphanumeric input to the content of the one or more item properties; and means for dynamically presenting any items that match the alternative alphanumeric input on a device screen, the dynamic presentation of items that match the alternative alphanumeric input continuously refreshes and updates the items that match as each character of alphanumeric input is entered.

19. The system of claim 18, the system further comprises a means for truncating at least a portion of content in the presented match to make a view of the alternative alphanumeric characters visible on the device screen.

20. The system of claim 18, the system further comprises a means for visually enhancing a view of the matched items to indicate the alternative alphanumeric characters.

\* \* \* \* \*